Oct. 30, 1934.  H. O. ROOSENSTEIN  1,978,818
FREQUENCY STABILIZATION
Filed Jan. 31, 1931

INVENTOR
HANS OTTO ROOSENSTEIN
BY
ATTORNEY

Patented Oct. 30, 1934

1,978,818

UNITED STATES PATENT OFFICE 1,978,818

FREQUENCY STABILIZATION

Hans Otto Roosenstein, Berlin, Germany, assignor to Telefunken Gesellschaft fur Drahtlose Telegraphie m. b. H., Berlin, Germany, a corporation of Germany Application January 31, 1931, Serial No. 512,652
In Germany March 1, 1930

5 Claims. (Cl. 250—36)

The frequency-stabilizing effect of an oscillation circuit in a transmitter tube is chiefly ascribable to the marked dependence of the phase of the current and the potenial of a circuit, close to the state of resonance, upon the frequency. A change in the frequency caused, for example, by a variation in the working voltage and the properties of the generator tube, or alterations in the impedance of the connecting wires of the generator carrying radio frequency energy, disturbs the phase stability between generator and oscillation circuit in such manner that the frequency change in major part is counteracted. The lower the damping of the oscillation circuit, the greater will be the phase change in the presence of a given deviation of the generator wave from the natural frequency of the oscillation circuit and therefore the stabilizing effect of the same. But the stabilizing action would be still greater if it were feasible to find means and ways adapted to raise the phase change of a given circuit by some sort of a phase amplifier to a multiple of the initial value.

To do so is an object of this invention and it is accomplished by deriving regenerative energy from the plate circuit of the generator from two coupler elements, the currents flowing through them presenting a phase difference or angle with reference to each other being dependent upon the frequency, and by forming harmonics from the energy derived from these two regenerative elements which, when caused to result in beats and when subjected to joint rectification, result in alternating current phase shifted energy of the fundamental wave which is fed to the grid circuit of the generator.

Figure 1:
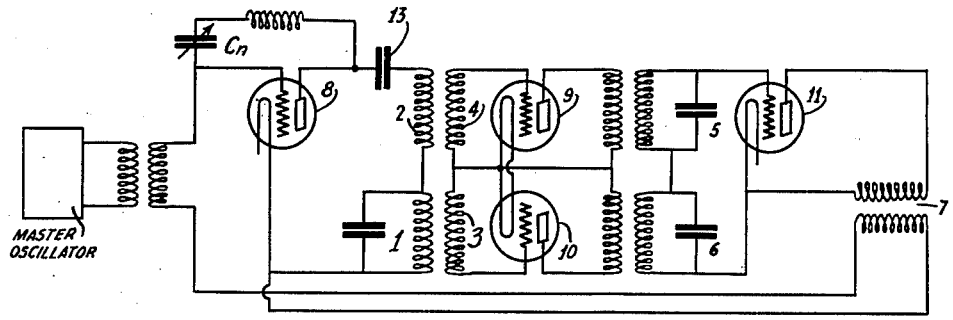
Figure 2:
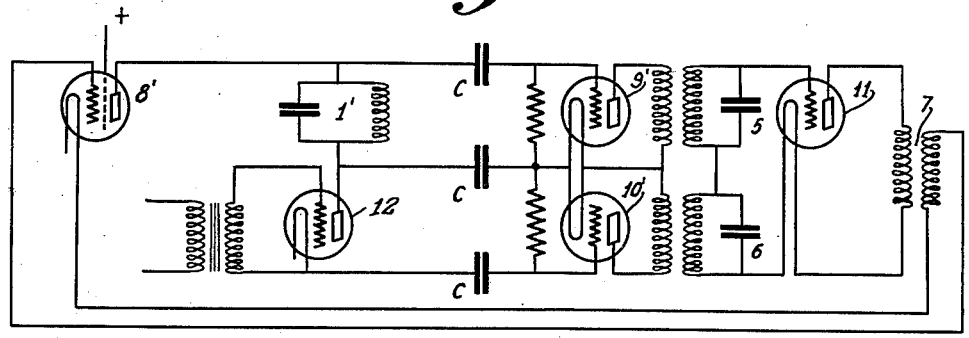
Figure 3:
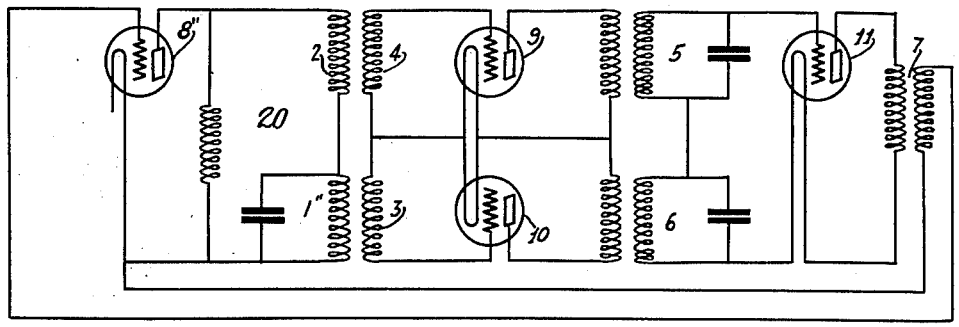

In the accompanying drawing,

Figure 1 illustrates an arrangement, according to the present invention, wherein harmonic energy is derived directly from an oscillator for phase shifting purposes, and, Figures 2 and 3 are modifications of Figure 1.

According to the invention as diagrammatically illustrated by Figure 1, oscillation circuit 1 of the transmitter shall be supposed to have a fundamental wave $w_0$, and it is assumed that for some reason or another the frequency assumes a value $w$. Referring to the plate current of tube 8, there is caused as a result, a change in the phase of the current in the oscillation circuit 1 amounting to an angle $\phi$.

Now, in the presence of normal direct regeneration the said angle $\phi$ would be the decisive factor tending to counteract a frequency change. But in the scheme illustrated in Figure 1 regeneration takes place by way of the tubes 9, 10 and 11. In the plate circuit of tube 9 a frequency nine times higher is generated, and in the plate circuit of tube 10 the ten-fold frequency, also the angle $\phi$ being incidentally raised ten times and being present in the form of an enlarged phase angle. In the grid circuits 5, 6 of the mixer tube 11, the differential frequency of oscillations $10wt+10\phi$ and $9wt$ is formed, and this corresponds to the frequency $wt+10\phi$.

From the plate circuit of frequency multiplier tube 9 the nine-fold frequency, say $\cos 9wt$, and from the plate circuit of tube 10 the ten-fold frequency, say, $\cos (10wt+10\phi)$ is transferred to the grid circuits 5 and 6 of the "mixing" tube 11, wherein the differential frequency $\cos (10wt+10\phi-9wt) = \cos (wt+10\phi)$ is produced.

This oscillation is supplied to the grid circuit of the first tube, and owing to the presence of the angle $10\phi$ it insures a ten times greater frequency stabilization than would be possible by direct regenerative coupling.

If still greater multiplications were used, say, in two stages 36-fold and 35-fold of the fundamental wave, respectively, the frequency stabilization conditions could be still further enhanced. The harmonics 35 and 36 times the fundamental frequency result in the mixing tube again in the fundamental frequency, but with an increased phase angle shift equal to $36\phi$.

It will be evident that all tendencies to direct regeneration on the part of tube 8 should be suppressed. Hence, means adapted to neutralize this tube must be provided, or else a high-grade screen-grid tube must be used. If desired, a low power master oscillator, as shown, may be provided, the apparatus following it acting to pull it into step at a desired frequency. In other words, the present invention need not be applied directly to an oscillator, but to any amplifier following an oscillator.

In the scheme shown in Fig. 1, the two coupling elements which insure the derivation of high-frequency currents presenting a phase displacement angle depending upon the frequency consist of a fly-wheel or resonant circuit 1 and an inductance coil 2 whose impedance is neutralized by a condenser 13 in series therewith. However, it is also possible to arrange the latter in parallel or to provide merely an inductance or else a resistance or a capacity instead of circuit 2 for the purpose of obtaining regeneration energy.

Inductance coils 3 and 4 couple the respective tubes 10 and 9 to circuits 1 and 2 respectively. Transformer 7 supplies the oscillations from the mixing tube 11 to the grid of the first tube.

In the case of plate modulation schemes it is also possible, as shown in Figure 2, to derive, directly, regenerative energy from an audio frequency modulator tube 12 connected in series with the fly-wheel circuit 1', as shown in Figure 2. The frequency multiplier tubes 9', 10', in this instance are connected by way of fixed coupling condensers C. In this particular embodiment a screen grid tube 8' is shown for the first tube.

Figure 3 shows a circuit arrangement in which the two coupling elements 1'', 2 when regenerative energy is desired, are disposed in a joint tuned circuit 20. Oscillations from transformer 7 are in this figure supplied to the grid of tube 8.

I claim:

1. A frequency stabilized oscillation system comprising a source of oscillations, a plurality of means for producing different phase relations with change in frequency of the oscillations produced, separate means coupled to said plurality of means for producing successive harmonics of said oscillations, said separate means being arranged to multiply any phase difference applied thereto, means for combining the harmonics to produce energy of a frequency corresponding to said source but having a multiplied phase shift angle, and means for feeding back to said source energy of the frequency of said source derived from the combining of the harmonic energies.

2. In a regeneratively coupled oscillation generator wherein there is a tendency of the generated oscillations to drift in frequency from the desired value, a method of stabilization which comprises obtaining from the generated energy two waves which have a different phase relation with respect to the frequency of the generated oscillations in accordance with frequency drift, obtaining from said two waves two successive harmonics, combining said two harmonic currents to produce energy of a frequency equal to the difference of the two harmonic frequencies, and applying the resultant combined energy to the oscillation generator.

3. A regeneratively coupled oscillation generator comprising an electron discharge device generating oscillations of a fundamental frequency, a plurality of means for producing different phase relations with change in frequency of the oscillations produced, a plurality of electron discharge devices each being individual to one of said means coupled to said plurality of means for producing successive harmonics of said oscillations, said last electron discharge devices being arranged to multiply any phase difference applied thereto, and still another electron discharge device for combining the harmonics to produce energy of a frequency corresponding to said fundamental frequency but having a multiplied phase shift angle, and means for feeding back to said oscillation generator energy of the fundamental frequency derived from the combining of the harmonic energies.

4. A regeneratively coupled oscillation generator comprising an electron discharge device generating oscillations of a fundamental frequency, having input and output circuits, a distorting device fed with voltage from said output circuit, said voltage having a fixed phase relation with respect to the generated oscillations, a second distorting device fed with voltage from said output circuit, said last voltage having a phase relation with respect to the generated oscillations which varies with frequency, means for applying to a detector a harmonic voltage from said first distorting device and an adjacent harmonic from said second distorting device, and means for impressing upon the input circuit of said electron discharge device the voltage of the fundamental frequency derived from said detector.

5. A regeneratively coupled oscillation generator comprising an electron discharge device generating oscillations of a fundamental frequency, input and output circuits therefor, said output circuit having a first inductance coil and a second inductance coil, a condenser in parallel with said second coil forming therewith a parallel tuned circuit which is resonant to the fundamental frequency, a plurality of other electron discharge devices having input circuits, one of which is coupled to said first coil and the other of which is coupled to said second coil, selective means for obtaining a plurality of successive harmonics of the fundamental frequency from said plurality of electron discharge devices, means for combining said harmonics to obtain a beat frequency, and means for applying said beat frequency to the input circuit of said first electron discharge device.

HANS OTTO ROOSENSTEIN.